United States Patent
Wilson et al.

(10) Patent No.: US 9,494,186 B2
(45) Date of Patent: Nov. 15, 2016

(54) ROTATIONAL DEGREE OF FREEDOM JOINT CONSTRAINT

(71) Applicant: Raytheon Company, Waltham, MA (US)

(72) Inventors: Shane E. Wilson, Waltham, MA (US); Hans P. Naepflin, Waltham, MA (US)

(73) Assignee: Raytheon Company, Waltham, MA (US)

( * ) Notice: Subject to any disclaimer, the term of this patent is extended or adjusted under 35 U.S.C. 154(b) by 264 days.

(21) Appl. No.: 13/915,403

(22) Filed: Jun. 11, 2013

(65) Prior Publication Data

US 2014/0363218 A1 Dec. 11, 2014

(51) Int. Cl.
*F16C 11/06* (2006.01)
*F16C 11/10* (2006.01)

(52) U.S. Cl.
CPC ............ *F16C 11/0685* (2013.01); *F16C 11/10* (2013.01); *Y10T 29/49648* (2015.01); *Y10T 403/32311* (2015.01)

(58) Field of Classification Search
CPC . F16C 11/0652; F16C 11/0685; F16C 11/08; F16C 11/083; F16C 11/0604; F16C 11/0609; F16C 11/0671; B23P 15/003
See application file for complete search history.

(56) References Cited

U.S. PATENT DOCUMENTS

| | | | |
|---|---|---|---|
| 2,614,873 A * | 10/1952 | Booth | 403/129 |
| 2,708,579 A | 5/1955 | Hugman | |
| 2,970,853 A * | 2/1961 | Baker | 403/125 |
| 3,211,405 A | 10/1965 | Fey et al. | |
| 3,276,798 A * | 10/1966 | Merriman | 403/77 |
| 3,387,871 A * | 6/1968 | Gottschald | 403/126 |
| 3,424,419 A * | 1/1969 | Siegel | 248/231.71 |
| 3,539,208 A | 11/1970 | Gonsalves et al. | |
| 3,843,272 A * | 10/1974 | Jorn | 403/132 |
| 4,003,666 A * | 1/1977 | Gaines et al. | 403/36 |
| 4,057,304 A * | 11/1977 | Gaines et al. | 384/125 |
| 4,105,344 A * | 8/1978 | Rousom | 403/24 |
| 4,575,162 A * | 3/1986 | Smith | 384/2 |
| 6,264,396 B1 | 7/2001 | Dobrovolny | |
| 2013/0077904 A1 * | 3/2013 | Jungeberg | 384/215 |

FOREIGN PATENT DOCUMENTS

| | | | |
|---|---|---|---|
| DE | 2402506 | * | 7/1975 |
| EP | 0950374 B1 | | 7/2007 |
| FR | 845561 | * | 8/1939 |

* cited by examiner

*Primary Examiner* — Jonathan Masinick

(57) ABSTRACT

A rotational degree of freedom joint constraint system is disclosed. The system can include joint constraint hardware, such as a first component and a second component. The first component can have a rotational interface, and a constraint feature associated with the rotational interface. The second component can have a socket operable with the rotational interface to facilitate relative movement of the first component and the second component in at least one rotational degree of freedom. The second component can form an opening configured to facilitate movement of the constraint feature therein upon the relative movement of the first component and the second component. The rotational degree of freedom joint constraint system can also include a locking mechanism operable with the constraint feature. Movement of the constraint feature within the opening can be preventable by the locking mechanism to constrain the relative movement of the first component and the second component.

15 Claims, 9 Drawing Sheets

ROTATIONAL DEGREE OF FREEDOM JOINT CONSTRAINT

BACKGROUND

Rotational degree of freedom joints, such as ball and socket joints or hinges, can be used to align and support a wide variety of items. For example, a strut can incorporate a ball and socket joint to align and support sensors. Such joints can provide infinite adjustment fidelity within a design range of motion. Upon achieving a proper alignment of the sensors, the joints can be constrained to maintain the alignment. Typically, joints are constrained to resist moment and/or torsion loads by relying on friction, in which the normal load is usually produced with a preload nut. The subsequent torque value is often very high since the friction coefficient between surfaces is intentionally low to allow for alignment adjustments.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
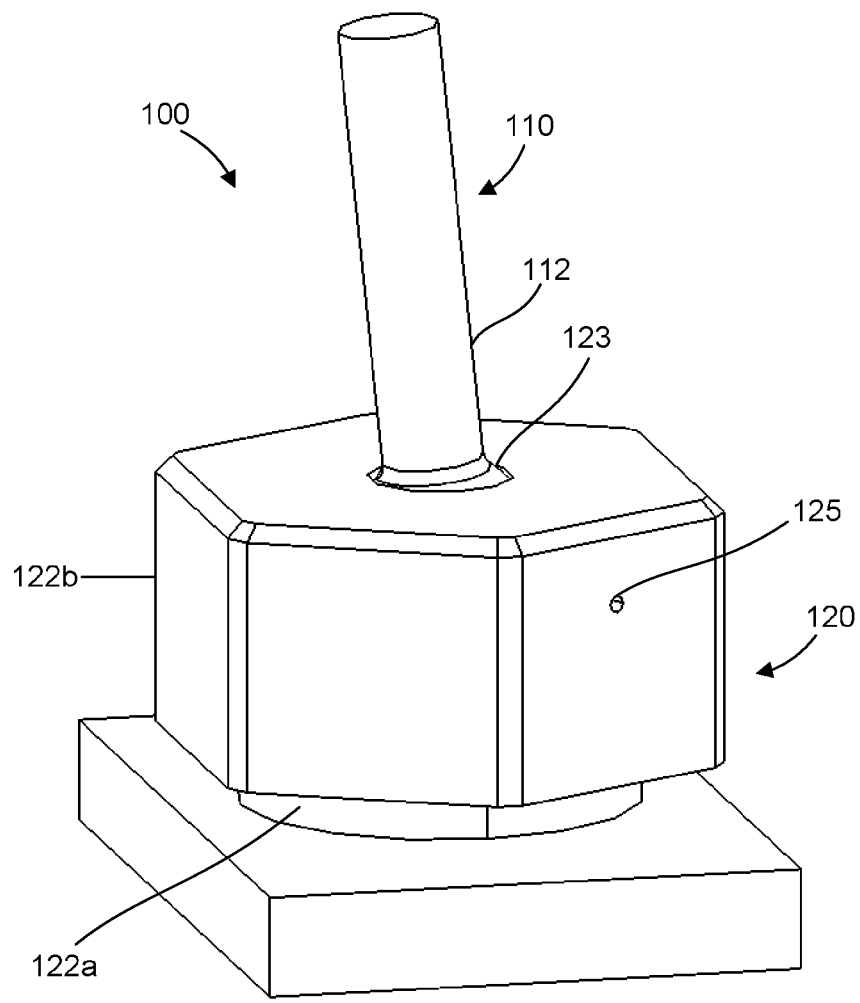
FIG. 1 is an example illustration of a rotational degree of freedom joint constraint system in accordance with an embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although typical joint constraint structures that rely on friction have been successfully utilized, the high torque often required to generate sufficient frictional forces to constrain the joint can be problematic to design and implement, and provide no guarantee against slippage of the joint. Thus, constraining a rotational degree of freedom joint in a manner that does not rely on friction can enable construction of robust joints that provide confidence in avoiding slippage and maintaining alignment.

Accordingly, a rotational degree of freedom joint constraint system is disclosed that positively locks or constrains the joint without relying on friction alone. In one aspect, the joint constraint system provides a physical or mechanical contact or interference to constrain the joint. The rotational degree of freedom joint constraint system can include a first component having a rotational interface, and a constraint feature associated with the rotational interface. The system can also include a second component having a socket operable with the rotational interface to facilitate relative movement of the first component and the second component in at least one rotational degree of freedom. The second component can form an opening configured to facilitate movement of the constraint feature therein upon the relative movement of the first component and the second component. The system can also include a locking mechanism operable with the constraint feature. Movement of the constraint feature within the opening can be preventable by the locking mechanism to constrain the relative movement of the first component and the second component.

In one aspect, joint constraint hardware for a rotational degree of freedom joint is disclosed. The joint constraint hardware can include a first component having a rotational interface, and a constraint feature associated with the rotational interface. The joint constraint hardware can also include a second component having a socket operable with the rotational interface to facilitate relative movement of the first component and the second component in at least one rotational degree of freedom. The second component can form an opening configured to facilitate movement of the constraint feature therein upon the relative movement of the first component and the second component. Movement of the constraint feature within the opening can be preventable by a locking mechanism operable with the constraint feature to constrain the relative movement of the first component and the second component.

Figure 2:
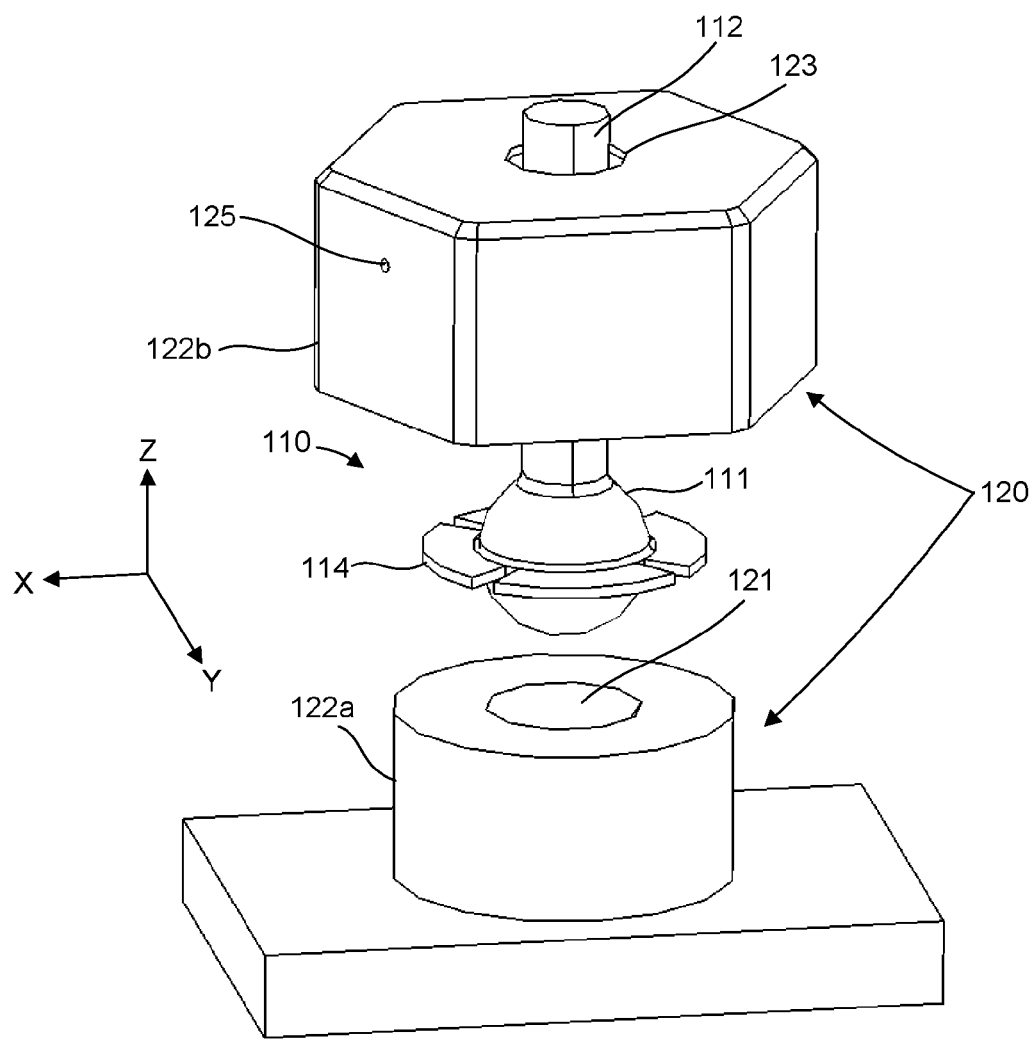
FIG. 2 is an exploded view of joint constraint hardware of the rotational degree of freedom joint constraint system of FIG. 1.
Figure 3:
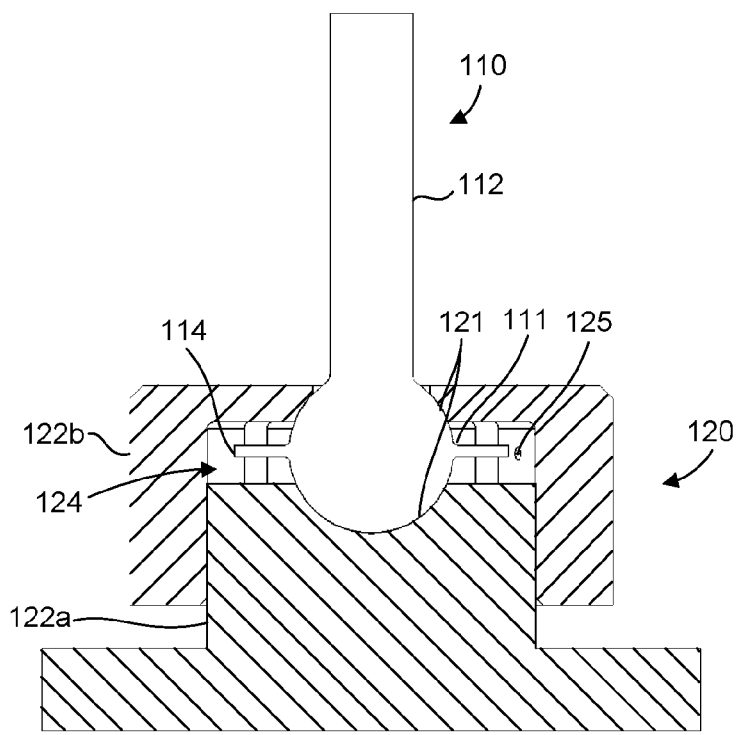
FIG. 3 is a cross-sectional view of the joint constraint hardware of FIG. 1.

One embodiment of a rotational degree of freedom joint constraint system 100 is illustrated in FIG. 1 and can include joint constraint hardware, such as shown in FIGS. 2 and 3. For example, the system 100 can comprise hardware, such as a first component 110 and a second component 120. The first component 110 can have a rotational interface 111, such as a ball or a cylinder, and a stud 112 extending from the rotational interface 111. Thus, in one aspect, the first component 110 can comprise a ball stud. The second component 120 can have a socket 121 operable with the rotational interface 111 to facilitate relative movement of the first component 110 and the second component 120 in one or more rotational degrees of freedom, such as rotation about one or more of the X, Y, and Z axes. The second component 120 can also include a hole 123 through which the stud 112 can extend. The stud 112 and the hole 123 can be configured to facilitate a desired range of relative rotational motion for the first component 110 and the second component 120.

In one aspect, the second component 120 can comprise a threaded base 122a and a nut 122b threadable onto the base 122a to form the socket 121 for the rotational interface 111. Thus, in this regard, the threaded base 122a, the nut 122b, and the ball stud 110 illustrated in the figures can function as a typical ball joint. For example, upon locating the first component 110 and the second component 120 at a desired relative position, the nut 122b and threaded base 122a can be tightened to "lock" the first component 110 and the second component 120 relative to one another. Although not shown, the nut 122b can be secured by a lock wire to the threaded base 122a to prevent unwanted loosening of the nut 122b. Such a "locking" mechanism relies upon frictional force between the rotational interface 111 and the socket 121, which can be achieved by applying a preload with the nut. Relying solely upon this type of "lock", the first component 110 and the second component 120 can be prone to slippage relative to one another when subjected to moment and/or torsional loading.

Figure 4:
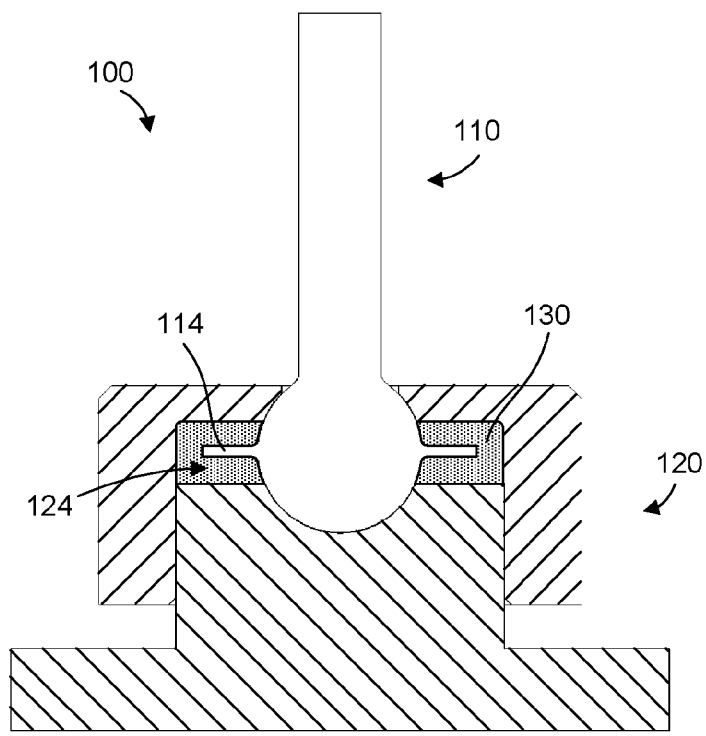
FIG. 4 is a cross-sectional view of the rotational degree of freedom joint constraint system of FIG. 1.

To provide an additional and more positive "lock" or constraint for the relative position of the first component 110 and the second component 120, the first component 110 can have a constraint feature 114 associated with the rotational interface 111, such as a "Saturn ring" configuration, as shown in FIGS. 2 and 3. The second component 120 can form an opening 124 configured to facilitate movement of the constraint feature 114 therein upon the relative movement of the first component 110 and the second component 120, such as when adjusting an alignment. The opening 124 and the constraint feature 114 can facilitate a desired range of relative rotational motion for the first component 110 and the second component 120 prior to locking or constraining the joint. In one aspect, the opening 124 can be formed between a portion of the base 122a and a portion of the nut 122b, as shown, wherein the nut 122b is fittable over the base 122a in a manner so as to leave and define an opening 124 therebetween. With reference to FIG. 4, and continued reference to FIGS. 1-3, the rotational degree of freedom joint constraint system 100 can include a locking mechanism 130 operable with the constraint feature 114 to constrain the relative movement of the first component 110 and the second component 120. For example, movement of the constraint feature 114 within the opening 124 can be prevented by the locking mechanism 130 to lock the first component 110 and the second component 120 relative to one another. In one aspect, the locking mechanism 130 can comprise a potting or encapsulant material disposed in the opening 124 and about the constraint feature 114 and the first component 110 and second component 120. For example, the potting material, in liquid form, can be injected into the opening 124 and allowed to set or harden into a solid, thus setting or locking the first and second components 120, 130 in place relative to one another and constraining their movement. To facilitate insertion or injection of the potting material, the second component 120 can include an injection port 125, such as in the nut 122b, to facilitate disposing the potting material in the opening 124 and about the constraint feature 114. It should be recognized that in some or alternative embodiments the base 122a can also have or alternatively have an injection port for the potting material. The potting material can comprise an epoxy, silicone, rubber, wax, or any other suitable potting or encapsulant material. For example, structural bonds such as Hysol® EA9394, 3M™ EC2216, and Emerson & Cuming Stycast® 2651-40 can be selected for space use, and "soft" materials such as Momentive™ RTV 556 can be selected for high temperature use and/or where high load capability is not required. In addition, a wax can be selected for re-workability in situations that require frequent disassembly.

Upon final assembly, and application and hardening of the potting or encapsulant material, the system 100 can lock or constrain relative movement of the first and second components 110, 120 relative to one another and resist loading, such as moment or torsional loading, by the mechanical contact or interference of the constraint feature 114 and the potting or encapsulant material of the locking mechanism 130 in the opening 124. In one aspect, the mechanical contact or interference created by the potting material can be effective to lock the joint without adhesion of the potting material to the constraint feature 114, although there can be some degree of adhesion. Thus, relative movement is constrained by direct contact (i.e., normal forces) of the constraint feature 114, the potting material of the locking mechanism 130, and the structure of the second component 120 forming, at least in part, the opening 124. The rotational degree of freedom joint constraint system 100 therefore utilizes a reliable mechanical contact or interference via the constraint feature 114, and does not rely only on the friction between the rotational interface 111 and the socket 121 to lock the joint.

Figure 5:
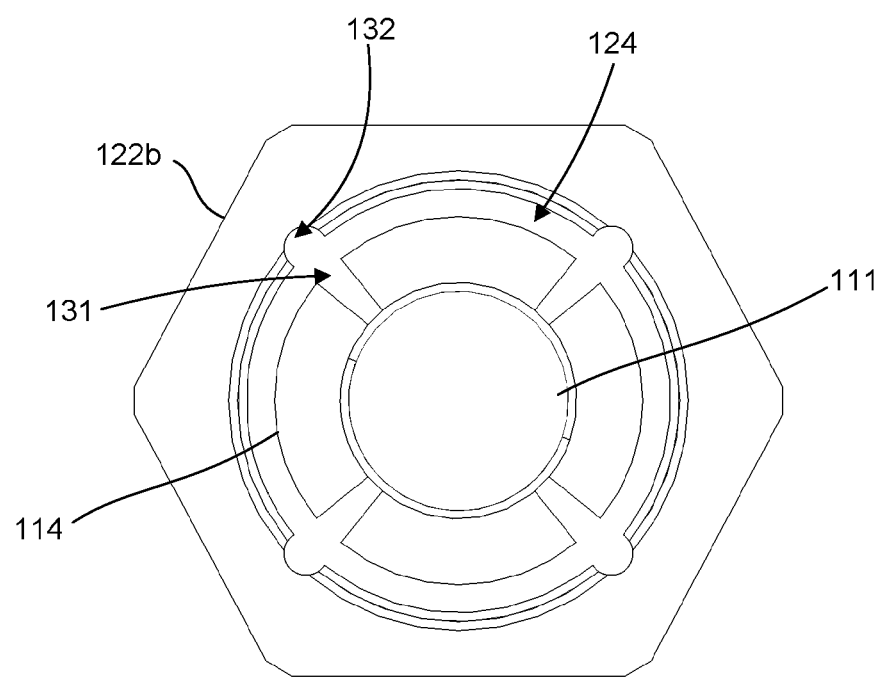
FIG. 5 is bottom cross-sectional view of joint constraint hardware components of FIG. 1.

FIG. 5 illustrates a bottom view of the rotational interface 111, the constraint feature 114, the nut 122b, and the opening 124 (the base 122a being hidden from view). In one aspect, as shown, the constraint feature 114 can comprise one or more protrusions extending from the rotational interface 111 to interface with the potting material, such as an annular protrusion (i.e., a Saturn ring). The protrusions can be configured to extend along an axis transverse to a longitudinal axis of the first component 110. In another aspect, the constraint feature 114 can comprise a recess, a cavity, a hole, a channel, or combinations thereof to interface with the potting material. For example, a channel 131 can be included with the constraint feature 114. In this case, the channel 131 can be defined by non-contacting edges of the plurality of protrusions, or stated differently, by one or more gaps formed in an annular protrusion.

In another aspect, one or more recesses, cavities, holes, or combinations thereof can be formed in one or both of the first and second components 110, 120 within the opening 124 to interface with the potting material. For example, a recess 132 can be formed in an interior of the nut 122b that defines, in part, the opening 124.

As so configured, the locking mechanism 130, in the form of the potting material, can be supported by or about the second component 120. The constraint feature, including, for example, channel 131, the recess 132, or other concave features, can be included to create shear features in the potting material, such that the joint can be locked by mechanical contact with the potting material and without adhesion.

Figure 6:
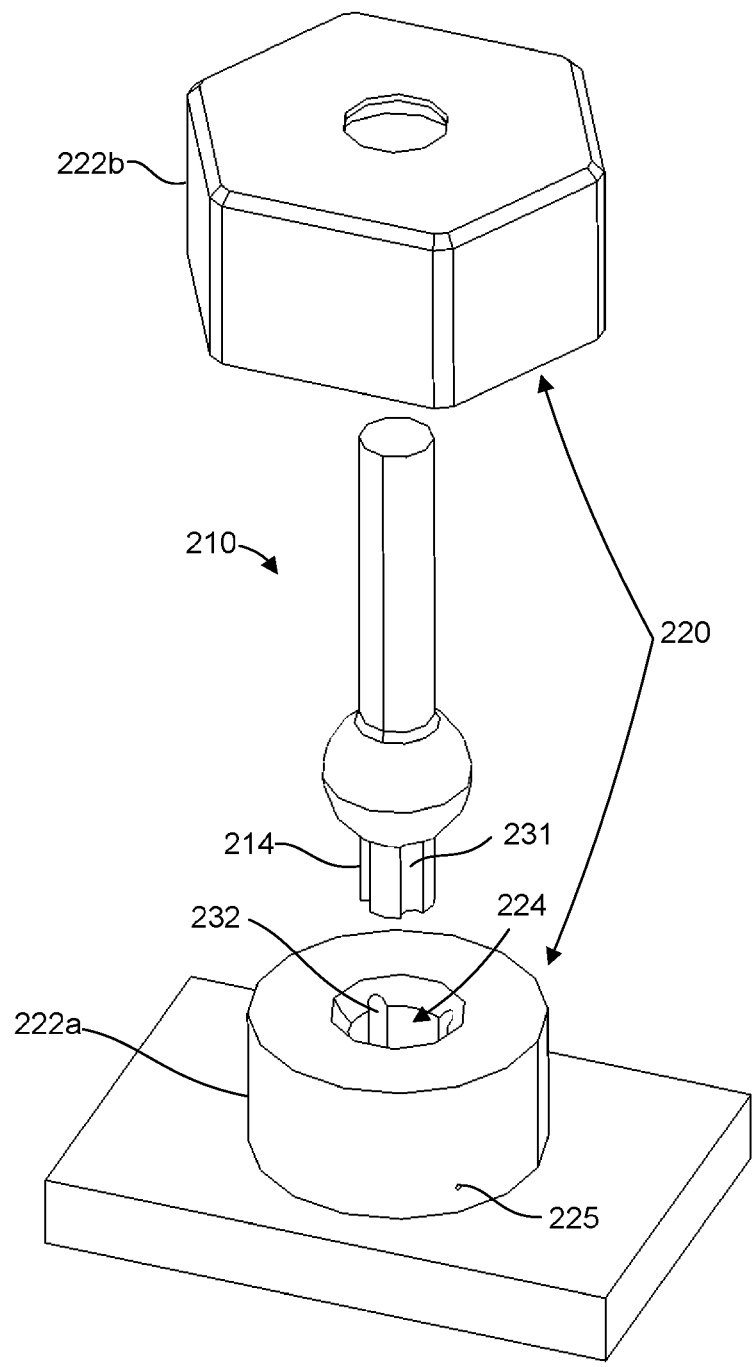
FIG. 6 is an example illustration of joint constraint hardware of a rotational degree of freedom joint constraint system in accordance with another embodiment of the present invention.
Figure 7:
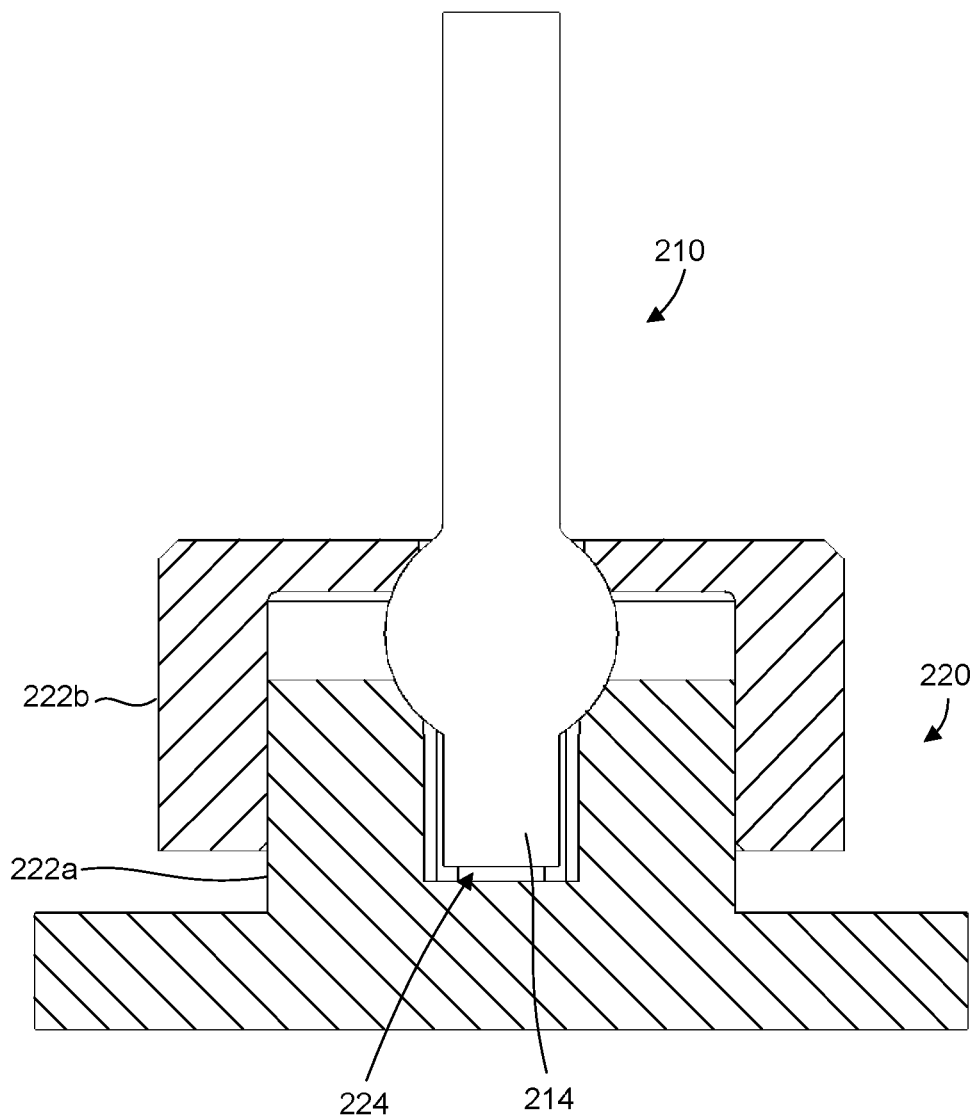
FIG. 7 is a cross-sectional view of the joint constraint hardware of FIG. 6.

FIGS. 6 and 7 illustrate another embodiment of joint constraint hardware, such as a first component 210 and a second component 220, which can be used in a rotational degree of freedom joint constraint system as disclosed herein. In this case, the second component 220 can be configured to provide an opening 224 to receive and accommodate a constraint feature 214 of the first component 210 as well as potting material in a threaded base 222a. In this case, the opening 224 is formed in the base 222a, independent of a nut 222b. The base 222a can also have an injection port 225 in fluid communication with the opening 224 to facilitate disposing of the potting material in the opening 224 and about the constraint feature 214. The constraint feature 214 can be in the form of or can comprise an extension member extending along a longitudinal axis of the first component 210, the constraint feature 214 having one or more recesses formed therein (e.g., see recess 231) to interface with the potting material. Similarly, the second component 220 can comprise one or more recesses (e.g., recess 232) formed therein within the opening 224 to interface with the potting material. For example, the recess 232 can be formed in an interior of the base 222a that defines the opening 224.

Figure 8:
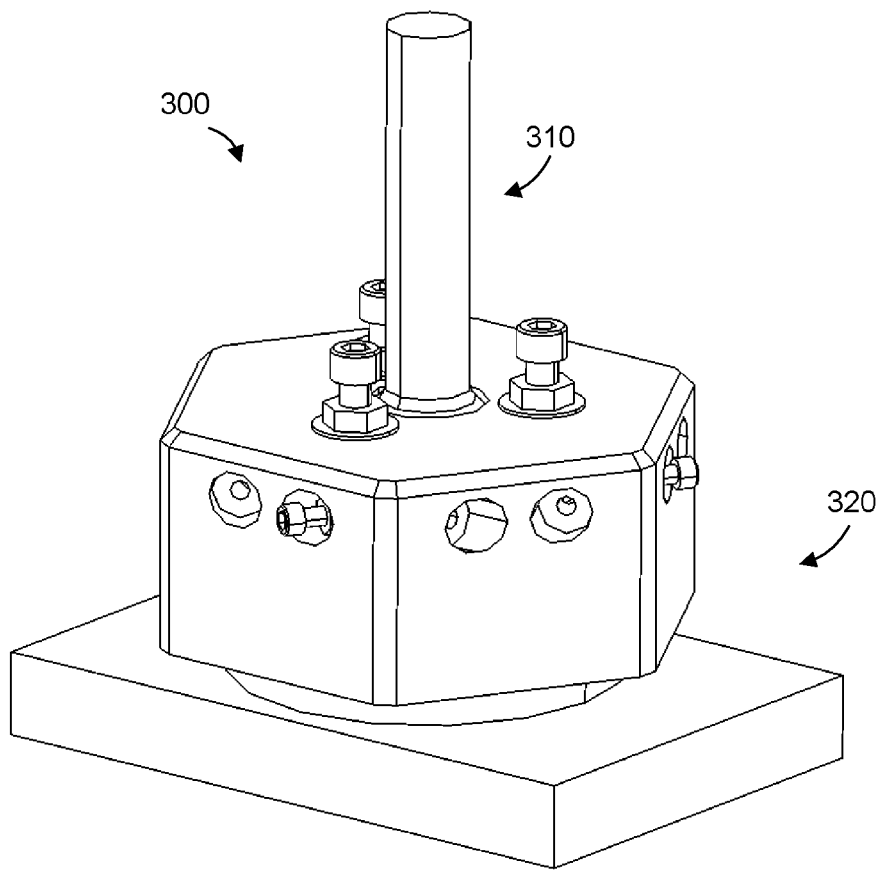
FIG. 8 is an example illustration of a rotational degree of freedom joint constraint system in accordance with yet another embodiment of the present invention.
Figure 9:
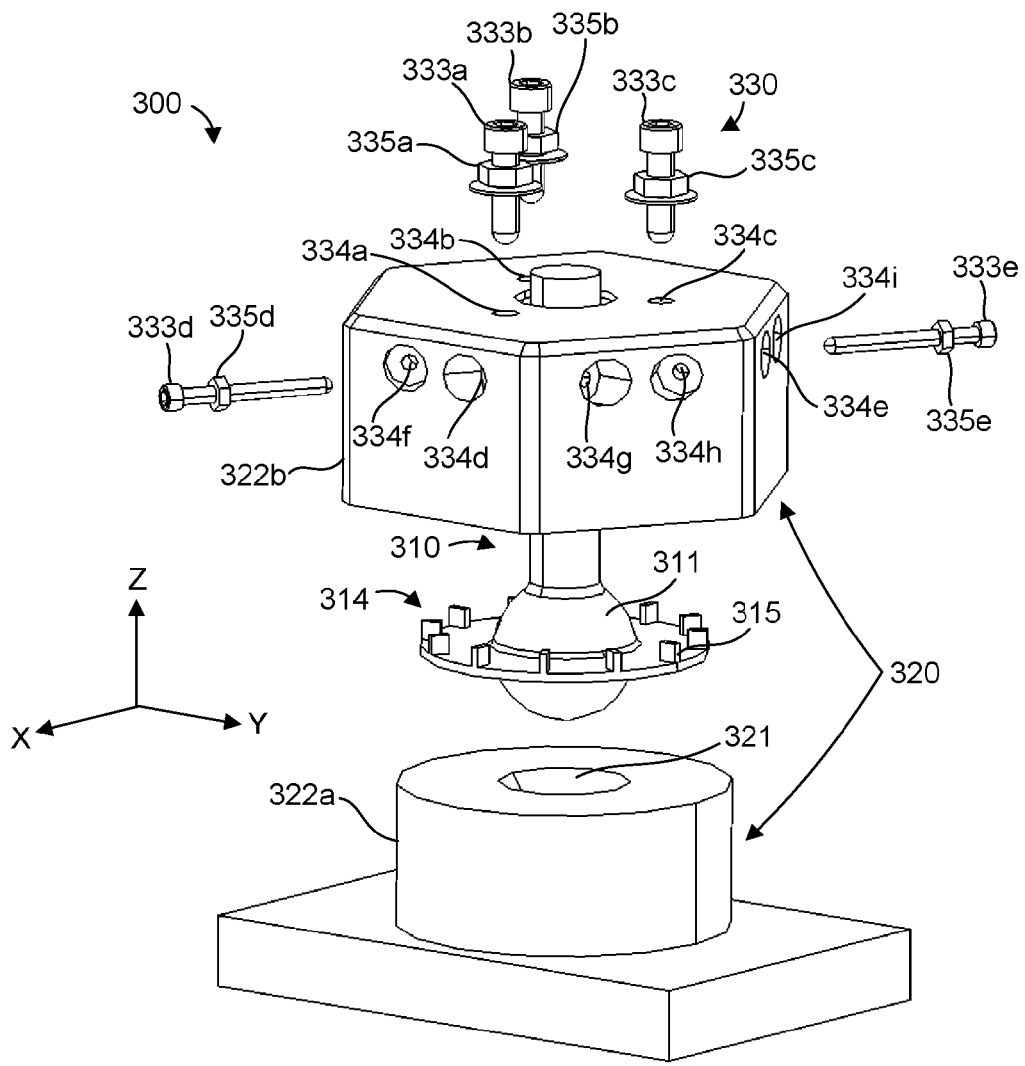
FIG. 9 is an exploded view of the rotational degree of freedom joint constraint system of FIG. 8.
Figure 10:
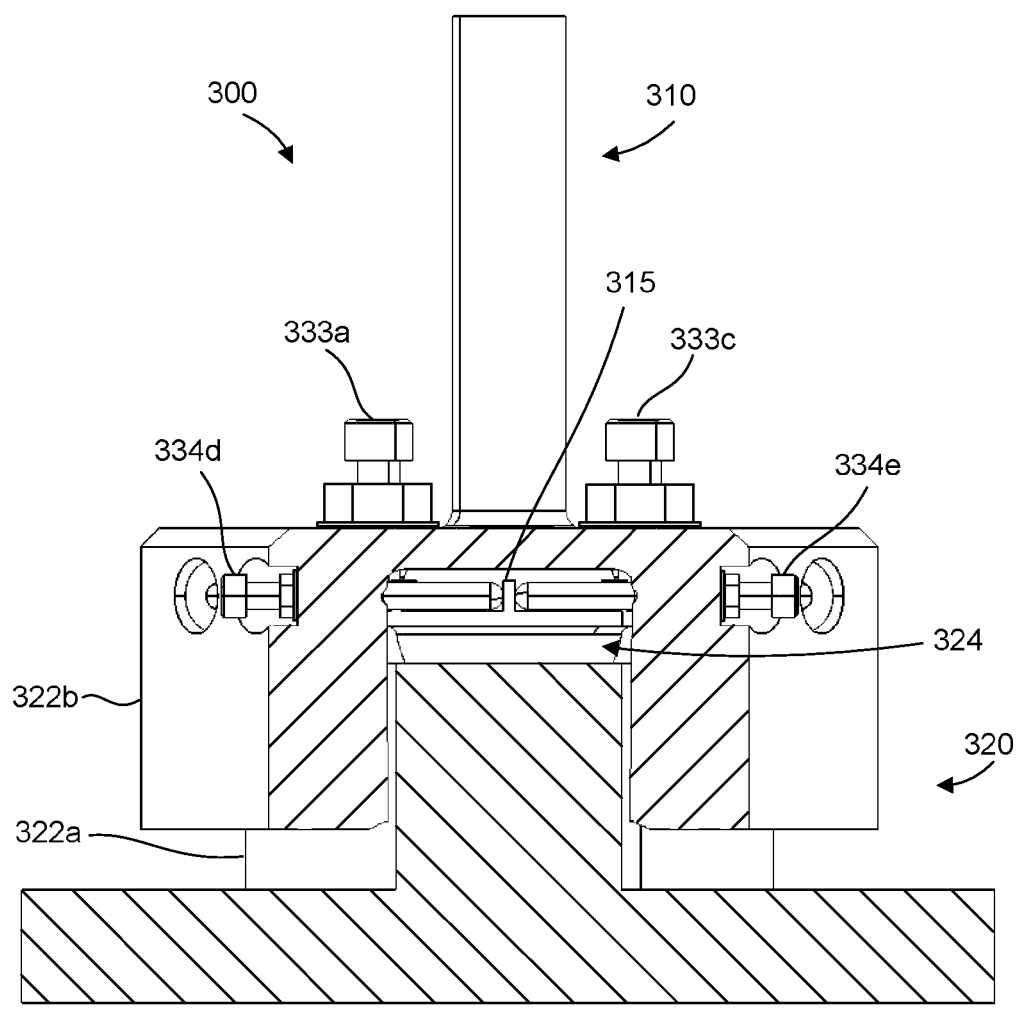
FIG. 10 is cross-sectional view of the rotational degree of freedom joint constraint system of FIG. 8.

FIGS. 8-10 illustrate another embodiment of a rotational degree of freedom joint constraint system 300, in accordance with the present disclosure. As with the embodiments illustrated in FIGS. 1-7 discussed hereinabove, joint hardware, such as a first component 310 and a second component 320, can include a rotational interface 311 and a socket 321 typical of a ball and socket joint formed by a threaded base 322a, a nut 322b, and a ball stud (i.e., first component 310). The first component 310 can have a constraint feature 314 associated with the rotational interface 311, such as a "Saturn ring" protrusion configuration extending from the rotational interface 311, as shown in FIGS. 9 and 10. The second component 320 can form or define an opening 324 similar in form and function as the openings discussed above. The opening 324 and the constraint feature 314 can facilitate a desired range of relative rotational motion between the first component 310 and the second component 320 prior to locking or constraining the joint. In one aspect, the opening 324 can be formed between a portion of the base 322a and a portion of the nut 322b.

The rotational degree of freedom joint constraint system 300 can also include a locking mechanism 330 operable with the constraint feature 314 to constrain the relative movement of the first component 310 and the second component 320. For example, movement of the constraint feature 314 within the opening 324 can be prevented by the locking mechanism 330 to lock the first component 310 and the second component 320 relative to one another. In the embodiment shown, the locking mechanism 330 can comprise one or more rods (e.g., see rods 333a-e) configured to contact the constraint feature 314 at various locations, such as by extending through a corresponding hole (e.g., see holes 334a-e, respectively) in the nut 322b. For example, rods 333a-c can contact a top surface of the constraint feature 314 to prevent rotation about the X and Y axes.

In one aspect, the constraint feature 314 can comprise one or more protrusions extending from the rotational interface 311 to interface with the rods. The constraint feature 314 can also include one or more rod interface features 315 to facilitate contact with the rods 333d, 333e to prevent rotation about the Z axis. Additional holes 334f-i can be included in the second component 320 to provide options for accessing and causing the rod interface feature(s) 315 to interface with the rods 333d, 333e depending on the orientation of the first component 310 relative to the second component 320. The number and placement of rod interface features 315 and holes 334d-i can be configured such that two rods 333d, 333e can be in contact with any given rod interface feature 315 regardless of the orientation of the first component 310 relative to the second component 320 while achieving a desired range of angular motion.

The rods 333a-e can each comprise a threaded rod, a screw, a bolt, a hydraulic ram, a pneumatic ram, or combinations thereof. In one aspect, the rods 333a-e can be threaded into the holes 334a-e, these being adjustable to vary the distance caused to extend into the channel 324 and toward the first component 310. The rods 333a-e can be individually adjusted and brought into contact with the constraint feature 314, such as by threading through the holes 334a-e, respectively, in the nut 322b. The locking mechanism 330 can therefore be supported by the second component 320, and can be adjustable to accommodate the positioning of the first and second components 310, 320 relative to one another. In one aspect, the rods 333a-e can be configured to comprise a ball or other curved end to contact the constraint feature 314 at a point. In one aspect, the rods 333a-e can be preloaded against the constraint feature 314. Jam nuts 335a-e can be used to prevent the rods 333a-e from moving in threaded holes 334a-e, respectively, once these are in place against the constraint feature 314. Thus, upon final assembly, the system 300 can lock or constrain relative movement of the first and second components 310, 320 relative to one another and resist loading, such as moment or torsional loading, by the mechanical contact or interference of the constraint feature 314 and the rods 333a-e of the locking mechanism 330. The rotational degree of freedom joint constraint system 300 therefore utilizes a reliable mechanical contact or interference and does not rely only on the friction between the rotational interface 311 and the socket 321 to lock the joint.

In accordance with one embodiment of the present invention, a method for facilitating constraint of a rotational degree of freedom joint is disclosed. The method can comprise providing a first component having a rotational interface, and a constraint feature associated with the rotational interface. The method can also comprise providing a second component having a socket operable with the rotational interface to facilitate relative movement of the first component and the second component in at least one rotational degree of freedom, wherein the second component forms an opening configured to facilitate movement of the constraint feature therein upon the relative movement of the first component and the second component. Additionally, the method can comprise facilitating prevention of constraint feature movement within the opening by a locking mechanism operable with the constraint feature to constrain the relative movement of the first component and the second component. It is noted that no specific order is required in this method, though generally in one embodiment, these method steps can be carried out sequentially.

In one aspect, the locking mechanism can comprise a potting material disposable in the opening and about the constraint feature. In another aspect, the locking mechanism can comprise at least one rod supported about the second component and configured to contact the constraint feature.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. Joint constraint hardware for a rotational degree of freedom joint, comprising:
    a first component having a rotational interface forming a ball, and a constraint feature associated with the rotational interface, the constraint feature comprising an extension member extending from an axial end of the rotational interface along a central longitudinal axis of the first component, the extension member comprising one or more recesses formed therein; and
    a second component having a socket operable with the rotational interface to facilitate relative movement of the first component and the second component in at least one rotational degree of freedom, wherein the second component forms an opening configured to facilitate movement of the constraint feature therein upon the relative movement of the first component and the second component,
    wherein movement of the constraint feature within the opening is preventable by a locking mechanism operable with the constraint feature to constrain the relative movement of the first component and the second component.

2. The joint hardware of claim 1, wherein the locking mechanism comprises a potting material disposable in the opening and about the constraint feature.

3. The joint hardware of claim 2, further comprising an injection port to facilitate disposing the potting material in the opening and about the constraint feature.

4. The joint hardware of claim 2, wherein the constraint feature comprises a recess, a cavity, a hole, or combinations thereof to interface with the potting material.

5. The joint hardware of claim 2, wherein the opening comprises a recess, a cavity, a hole, or combinations thereof to interface with the potting material.

6. The joint hardware of claim 1, wherein the second component comprises a threaded base and a nut threadable onto the base to form the socket.

7. A rotational degree of freedom joint constraint system, comprising:
    a first component having a rotational interface forming a ball, and a constraint feature associated with the rotational interface, the constraint feature comprising an extension member extending from an axial end of the rotational interface along a central longitudinal axis of the first component, the extension member comprising one or more recesses formed therein;
    a second component having a socket operable with the rotational interface to facilitate relative movement of the first component and the second component in at least one rotational degree of freedom, the socket and the rotational interface interfacing with one another to provide friction when the first and second components are coupled to one another to at least partially constrain the relative movement of the first component and the second component, wherein the second component forms an opening configured to facilitate movement of the constraint feature therein upon the relative movement of the first component and the second component; and
    a locking mechanism operable with the constraint feature, wherein movement of the constraint feature within the opening is preventable by the locking mechanism to constrain the relative movement of the first component and the second component.

8. The system of claim 7, wherein the locking mechanism comprises a potting material disposable in the opening and about the constraint feature.

9. The system of claim 8, wherein the potting material comprises an epoxy, silicone, rubber, wax, or combinations thereof.

10. The system of claim 7, wherein the locking mechanism is supported by the second component.

11. A method for facilitating constraint of a rotational degree of freedom joint, comprising:
    providing a first component having a rotational interface forming a ball, and a constraint feature associated with the rotational interface, the constraint feature comprising an extension member extending from an axial end of the rotational interface along a central longitudinal axis of the first component, the extension member comprising one or more recesses formed therein;

providing a second component having a socket operable with the rotational interface to facilitate relative movement of the first component and the second component in at least one rotational degree of freedom, the socket and the rotational interface interfacing with one another to provide friction when the first and second components are coupled to one another to at least partially constrain the relative movement of the first component and the second component, wherein the second component forms an opening configured to facilitate movement of the constraint feature therein upon the relative movement of the first component and the second component; and facilitating prevention of constraint feature movement within the opening by a locking mechanism operable with the constraint feature to constrain the relative movement of the first component and the second component.

12. The method of claim 11, wherein the locking mechanism comprises a potting material disposable in the opening and about the constraint feature.

13. Joint constraint hardware for a rotational degree of freedom joint, comprising:

a first component having a rotational interface, and a constraint feature associated with the rotational interface, the constraint feature comprising one or more recesses formed therein; and a second component having a socket operable with the rotational interface to facilitate relative movement of the first component and the second component in at least one rotational degree of freedom, the socket comprising one or more recesses formed therein corresponding to the one or more recesses in the constraint feature, wherein the second component forms an opening configured to facilitate movement of the constraint feature therein upon the relative movement of the first component and the second component, wherein movement of the constraint feature within the opening is preventable by a locking mechanism operable with the constraint feature to constrain the relative movement of the first component and the second component.

14. The joint hardware of claim 13, wherein the constraint feature comprises a protrusion extending from the rotational interface to interface with the potting material.

15. The joint hardware of claim 13, wherein the rotational interface comprises a ball or a cylinder.

\* \* \* \* \*